United States Patent [19]

Kawachi et al.

[11] 4,306,767
[45] Dec. 22, 1981

[54] SINGLE-MODE OPTICAL FIBER

[75] Inventors: Masao Kawachi; Tadashi Miyashita, both of Mito; Shintaro Sentsui, Ciba; Yasuro Furui, Ichihara; Toshiaki Kuroha, Yokohama, all of Japan

[73] Assignees: Nippon Telegraph & Telephone Public Corporation; The Furukawa Electric Co., Ltd., both of Tokyo, Japan

[21] Appl. No.: 91,948

[22] Filed: Nov. 7, 1979

[30] Foreign Application Priority Data

Nov. 13, 1978 [JP] Japan .................. 53-139699

[51] Int. Cl.³ .............................................. G02B 5/172
[52] U.S. Cl. ........................ 350/96.33; 350/96.34; 65/3.12
[58] Field of Search ............... 350/96.30, 96.33, 96.34; 65/3, 11, 3.12

[56] References Cited

U.S. PATENT DOCUMENTS

| | | | |
|---|---|---|---|
| 3,884,550 | 5/1975 | Maurer et al. | 350/96.30 |
| 4,106,850 | 8/1978 | Marcatili | 350/96.34 X |
| 4,111,525 | 9/1978 | Kaminow et al. | 350/96.34 X |
| 4,114,980 | 9/1978 | Asam et al. | 350/96.33 |

FOREIGN PATENT DOCUMENTS 2524335 12/1975 Fed. Rep. of Germany ... 350/96.30

OTHER PUBLICATIONS

Sommer et al., "New Glass System For Low-Loss Optical Waveguides", *Elect. Lett.,* vol., 12, No. 16, Aug. 1976, pp. 408–409.

Shibata et al., "Low-Loss High-Numerical-Aperture Optical Fibre . . . ", *Elect. Lett.,* vol. 15, No. 21, Oct. 1979, pp. 680–681.

Edahiro et al., "Phosphor-Doped Silica Cladding V.A.D. Fibres", *Elect. Letters,* vol. 15, No. 22, Oct. 1979, pp. 726–728.

*Primary Examiner*—John D. Lee
*Attorney, Agent, or Firm*—George B. Oujevolk

[57] ABSTRACT

The invention relates to a single-mode optical fiber used in a long wavelength band range for optical telecommunication. The core and the cladding of this optical fiber contain $P_2O_5$ as a dopant selected to lower the deposition temperature and to hasten the deposition speed so as to result in low absorption loss.

2 Claims, 3 Drawing Figures

REFRACTIVE INDEX

RADIAL DIRECTION

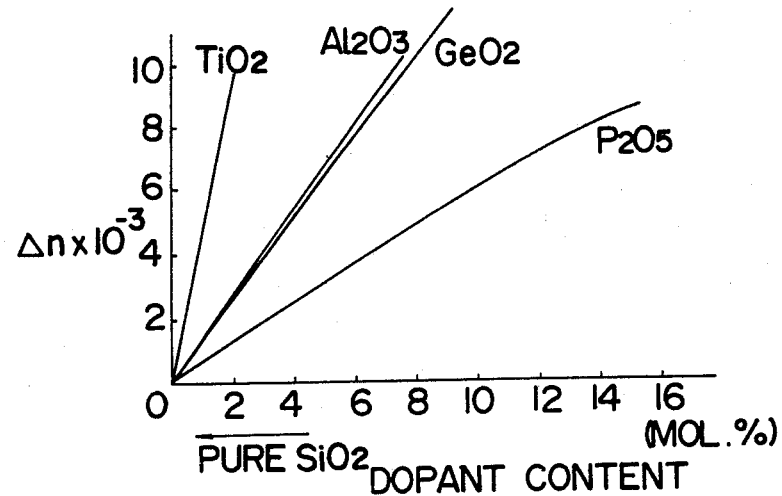
F I G. 1
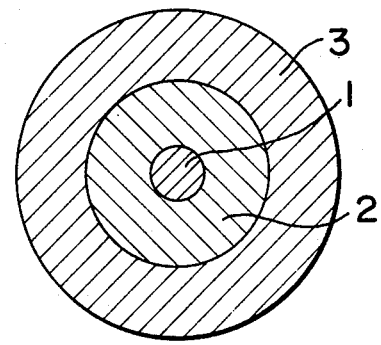
F I G. 2
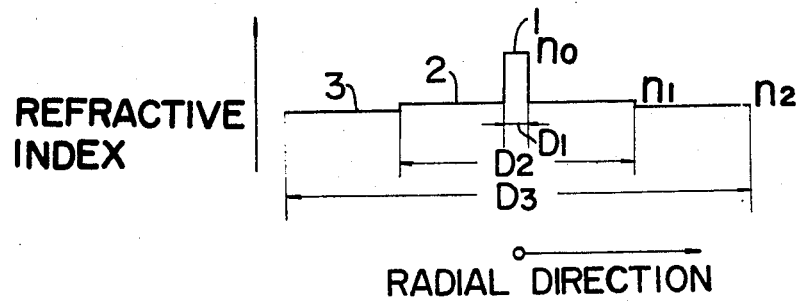
F I G. 3

SINGLE-MODE OPTICAL FIBER

BACKGROUND OF THE INVENTION

This invention relates to a single-mode optical fiber which is used in a wavelength band range of 1.2 to 1.8 μm for optical telecommunication.

Generally, an optical fiber of this type is produced by drawing preformed rods produced by a modified chemical vapor deposition process (MCVD) for the purpose of obtaining the fiber of low transmission loss and high transmission capacity. More particularly, an optical fiber is made by a process which has the steps of supplying raw material gas such as silcon tetrachloride, metallic chloride as a dopant for changing the refractive index, and also oxygen into a quartz glass tube rotating the tube on its tubular axis as a rotating axis from one end to the other end of the tube and applying heat from a heater moving along the tube and arranged outside the tube and heating the inside of the tube to oxidize the raw material gas so as to sequentially deposit $SiO_2$ glass cladding and core on the inner wall of the tube, then increasing the heat from the heater to soften the tube so as to form a rod which is located in the hollow portion of the tube, and then gradually hot drawing the formed rods from the ends thereof.

The conventional single-mode optical fiber made by the aforementioned process was heretofore made for that use in a wavelength range of 0.8 to 0.9 μm of semiconductor laser diode (LD) and incorporated with a core of pure $SiO_2$ glass and a cladding of $B_2O_3$-$SiO_2$ glass.

The optical fiber of such a structure can reduce Rayleigh scattering (which has a loss proportional to $1/\lambda^4$ where λ represents the used wavelength of light) which occurred due to the irregular array of glass molecules with the $SiO_2$ of high purity.

In order to obtain an optical fiber of low loss in longer wavelength bands of 1.2 to 1.8 μm, there is the problem of the increase in loss caused by the vibration absorption in infrared B-O bond at the shorter wavelength side as compared with Si-O P-O bond. Accordingly, the optical fiber used in the above longer wavelength must not contain, the $B_2O_3$. Thus, the conventional MCVD process employs the steps of depositing pure $SiO_2$ glass (cladding) containing no $B_2O_3$ on the inner wall of a quartz glass tube (as a supporting layer) and then depositing a layer to become a core. In addition, the conventional process formed a thicker cladding to thereby prevent the increase of loss of light waves of 1.38 μm due to the absorption of OH ions contained in the tube into the core.

When the conventional quartz glass tube thus employs the aforementioned pure $SiO_2$ glass as cladding, it requires a deposition temperature of 1,500° to 1,600° C. to form the cladding and also requires a long time to form the cladding of the same thickness due to low deposition speed. Furthermore, because of the long time and high temperature required to form the cladding, the OH ion contained in the quartz glass tube diffuses into the cladding deposited on the inner wall of the tube and even into the core upon completion of the glass fiber making it impossible to obtain an optical fiber having a low transmission loss. The high temperature further resulted in advancing the collapse of the quartz glass tube. There also occurred the problem of continuing the process while pressurizing the interior of the tube owing to the reduction in outer diameter of the tube if the process is continued with the advancement of the self-collapse of the tube.

SUMMARY OF THE INVENTION

The present inventor has found, as a result of numerous experiments and studies in view of the aforementioned problems of the conventional process, a novel process of fabricating an optical fiber by forming a cladding with $SiO_2$ glass containing a $P_2O_5$ dopant selected from a number of dopants so as to lower the deposition temperature and to fasten the deposition speed resulting in low absorption loss due to diffusion of OH ion and performance in transmission characteristics in practice.

More particularly, $SiO_2$ glass containing $P_2O_5$ allows low variations of refractive index per unit dopant content as compared with the $SiO_2$ glass containing another dopant, as shown in FIG. 1 and also permits a lower deposition temperature by more than 100° C. than the pure $SiO_2$ with only a slight amount of $P_2O_5$ and a much faster deposition speed by 8 to 10 times.

On the other hand, an optical fiber of high transmission capacity could not be fabricated heretofore by forming the cladding with a higher refractive index of the cladding than the supporting layer with a dopant for increasing the refractive index in the cladding due to the fact that a specified light mode is transmitted in the cladding.

The present inventor, however, has found the possibility to ignore the light mode thus transmitted via the cladding even by increasing the refractive index to some degree higher as compared with the supporting layer.

The prior optical fiber which increased the refractive index of the cladding higher than that of the supporting layer was disclosed in Japanese Patent Laid-Open No. 9,740 official gazette laid open on Apr. 7, 1978 and has $SiO_2$ glass including $TiO_2$ in the cladding with the result that cannot expect low deposition temperature, good deposition efficiency, and low transmission loss in longer wavelength region.

DETAILED DESCRIPTION OF THE PREFERRED EMBODIMENTS

These and other object and features of the present invention will become apparent from the following description of the preferred embodiments of the present invention when read with reference to the accompanying drawings, in which:

FIG. 1 is an explanatory view showing the specific refractive index of $SiO_2$ glass containing various dopants:

FIG. 2 is a sectional view of one preferred embodiment of the optical fiber constructed according to the present invention; and FIG. 3 is a refractive index distribution view of the glass fiber shown in FIG. 2.

Referring now to FIG. 2, the optical fiber of the present invention comprises a core 1, a cladding 2, and a supporting layer 3. The core is formed of $P_2O_5$-$SiO_2$, $GeO_2$-$SiO_2$ or $P_2O_5$-$GeO_2$-$SiO_2$ glass composition, and the cladding 2 is formed of $P_2O_5$-$SiO_2$ glass composition.

The optical fiber herein contemplated can be made by a process which has the steps of supplying raw material gas containing $SiCl_4$, $PCl_3$ and oxygen, etc. into a quartz glass tube to form a supporting layer 3 and heat from a heater arranged outside the quartz glass tube is directed into the tube to oxidize the raw material gas, depositing $P_2O_3$-$SiO_2$ glass thus formed on the inner wall of the quartz glass tube to form a cladding 2 layer, then supplying raw gas material to become a core 1 in the same manner into the quartz glass tube to oxidize the raw gas material so as to form a layer to become a core 1 on the inner wall of the cladding 2, then increasing the temperature of the heater to soften the tube to form rods in the hollow portion of the quartz glass tube, and then gradually hot drawing the formed rods by the ends. The optical fiber thus produced according to the present invention has a refractive index distribution of $$n_0 > n_1 > n_2$$

as shown in FIG. 3 where $n_0$ represents the maximum refractive index of the core 1, $n_1$ is the refractive index of the cladding 2, and $n_2$ is the refractive index of the supporting layer 3.

The optical fiber of the preferred embodiment shown in FIG. 2 is of single-mode transmission type with transmission wavelength of 1.3 μm, and has 1.458 of $n_2$, $1.0001 \times n_2$ of $n_1$, $1.003 \times n_1$ of $n_0$, 8 μm of diameter $D_1$ of the core 1, 40 μm of diameter $D_2$ of the cladding 2, and 125 μm of diameter $D_3$ of the supporting layer 3, wherein $n_0$, $n_1$, $n_2$, $D_1$ are defined so that the area of the cladding 2 including the core 1 becomes single-mode transmission type.

It is to be observed from the foregoing description that since the optical fiber of the present invention as exemplified in the embodiment described is formed of $SiO_2$ glass containing $P_2O_5$ in the cladding, the cladding can lower the deposition temperature of the MCVD process up to 1,400° C. as compared with the conventional optical fiber containing pure $SiO_2$ and can also hasten the deposition speed of both the cladding and the core 4 to 5 times as compared with the conventional optical fiber with the result that the OH ion contained in the quartz glass tube can hardly diffuse in the cladding formed on the inner wall of the quartz glass tube at deposition time to thus provide an optical fiber of lower absorption by the OH ion.

The more the dopant amount is increased as to the $P_2O_5$ contained in the $SiO_2$ glass forming the cladding 2, the lower the temperature at which the cladding 2 can be deposited and the higher it can be formed efficiently so as to hardly have any effect on the OH ion contained in the quartz glass tube. However, if the dopant amount is increased excessively, the refractive index of the cladding 2 is increased excessively as compared with that of the supporting layer, it becomes difficult to ignore the light mode transmitted in the cladding 2. Accordingly, it is preferred that the value of $n_1$ is equal to $1/5(n_0 - n_1) \geq (n_1 - n_2)$ in terms of the dopant amount.

It should be understood from the foregoing description that since the optical fiber having a core at the center, a cladding around the core, and a supporting layer around the cladding according to the present invention consists of the core of $GeO_2$-$SiO_2$ or $P_2O_5$-$GeO_2$-$SiO_2$ glass and the cladding of $P_2O_5$-$SiO_2$ glass, it can be produced by the MCVD process in a short time at a low deposition temperature and at a high deposition speed for the cladding resulting in the production of an optical fiber of low transmission loss single mode having a lesser amount of OH ion contained in the cladding and the core.

What is claimed is:

1. A single-mode optical fiber with a core formed at the center, a cladding formed around the core so that the core is of the single-mode transmission type, and a supporting layer formed around the cladding wherein said core comprises material selected from the group consisting of $P_2O_5$-$SiO_2$; $GeO_2$-$SiO_2$; and $P_2O_5$-$GeO_2$-$SiO_2$ glass composition, said cladding consists of high purity $P_2O_5$-$SiO_2$ glass composition, said supporting layer consisting of quartz glass, said $P_2O_5$ acting as a dope material, so that said cladding surface and core become a single-mode type of transmission optical fiber, the proportion of said dope material in the core and cladding being so regulated that the refractive index of the core, the cladding and the supporting layer have the following relationship:

$$n_1 > n_2 \text{ and } (n_0 - n_1) > (n_1 - n_2)$$

where
$n_0$ represents the maximum refractive index of the core,
$n_1$ is the refractive index of the cladding, and,
$n_2$ is the refractive index of the supporting layer, with the proviso that the value of $n_1$ should be equal to $1/5(n_0 - n_1) \geq (n_1 - n_2)$ with regard to the amount of dope material used.

2. In a process of producing a single-mode optical fiber for use in a long wavelength band, said process consisting of the steps of
(I) feeding through a hollow quartz tube a gas phase material containing $SiCl_4$, $PCl_3$ and O, and also including $P_2O_5$ as a doping substance, while directing heat into the tube to oxidize said material so as to deposit $P_2O_5$-$SiO_2$ glass on the inner wall of said quartz tube so as to form a cladding layer on said tube inner wall, the inner wall acting as a support;
(II) feeding the aforementioned gas phase material into said tube so as to form a core on the inner wall of said cladding layer;
(III) increasing the heating temperature of the heater to soften the tube to form rods in the hollow quartz tube; and,
(IV) gradually hot drawing said rods by their ends, the improvement in said process which consists of adjusting the doping so that the $P_2O_5$ in the cladding is slightly higher than said $P_2O_5$ doping substance in the core, so that the refractive index of the core, the cladding and inner wall support have the following relationship:

$$n_1 > n_2 \text{ and } (n_0 - n_1) > (n_1 - n_2)$$

where
$n_0$ represents the maximum refractive index of the core,
$n_1$ is the refractive index of the cladding, and,
$n_2$ is the refractive index of the inner wall support, with the proviso that the value of $n_1$ should be equal to $1/5(n_0 - n_1) \geq (n_1 - n_2)$.

* * * * *